US011357249B2

(12) United States Patent
De Castro et al.

(10) Patent No.: US 11,357,249 B2
(45) Date of Patent: Jun. 14, 2022

(54) SYNTHETIC MILK COMPOSITIONS COMPRISING N-6 EICOSATRIENOIC ACID AND POLAR LIPIDS FOR INFANTS YOUNGER AND OLDER THAN THREE MONTHS FOR HEALTHY ESTABLISHMENT OF COGNITIVE FUNCTION (71) Applicant: NESTEC S.A., Vevey (CH)

(72) Inventors: Carlos Antonio De Castro, Geneva (CH); Cristina Cruz-Hernandez, Epalinges (CH); Frederic Destaillats, Servion (CH); Francesca Giuffrida, Mezieres (CH); Rajat Mukherjee, Montreux (CH); Sagar Thakkar, St-Legier (CH)

(73) Assignee: Societe des Produits Nestle S.A., Vevey (CH)

( * ) Notice: Subject to any disclaimer, the term of this patent is extended or adjusted under 35 U.S.C. 154(b) by 594 days.

(21) Appl. No.: 15/104,013

(22) PCT Filed: Sep. 9, 2014

(86) PCT No.: PCT/EP2014/069131
§ 371 (c)(1),
(2) Date: Jun. 13, 2016

(87) PCT Pub. No.: WO2015/086178
PCT Pub. Date: Jun. 18, 2015

(65) Prior Publication Data
US 2016/0316809 A1 Nov. 3, 2016

(30) Foreign Application Priority Data
Dec. 12, 2013 (EP) .................................... 13196804

(51) Int. Cl.
A23L 33/00 (2016.01)
A23L 33/12 (2016.01)
A23L 33/10 (2016.01)

(52) U.S. Cl.
CPC ............... A23L 33/40 (2016.08); A23L 33/10 (2016.08); A23L 33/12 (2016.08); A23V 2002/00 (2013.01)

(58) Field of Classification Search
USPC .................................................... 426/2, 801
See application file for complete search history.

(56) References Cited

U.S. PATENT DOCUMENTS

| 4,670,285 A | 6/1987 | Clandinin et al. |
| 5,709,888 A | 1/1998 | Gil et al. |
| 2004/0265462 A1 | 12/2004 | Carlson |
| 2008/0003330 A1 | 1/2008 | Rueda et al. |

FOREIGN PATENT DOCUMENTS

| AU | 3200493 A | 10/1993 |
| EP | 2258218 | 12/2010 |
| NZ | 556699 A | 11/2009 |
| WO | 9605844 A1 | 2/1996 |
| WO | 2006041316 | 4/2006 |
| WO | 2007073192 A2 | 6/2007 |
| WO | 2009051502 A1 | 4/2009 |
| WO | 2009057121 | 5/2009 |
| WO | 2009068549 | 6/2009 |
| WO | 2009130291 A2 | 10/2009 |

OTHER PUBLICATIONS

Office Action issued in corresponding European Patent Application No. 14761641.1 dated May 19, 2017.
Rueda et al. "Changes during Lactation in Ganglioside Distribution in Human Milk from Mothers Delivering Preterm and Term Infants" Biol. Chem., 1996, vol. 377, pp. 599-601.
Sala-Vila et al. "Lipid composition in human breast milk from Granada (Spain): changes during lactation" Nutrition, 2005, vol. 21, pp. 467-473.
Haddad et al. "Trends in fatty acids positional distribution inhuman colostrum, transitional, and mature milk" Eur Food Res Technol, 2012, vol. 235, pp. 325-332.
Thakkar et al., "Dynamics of Human Milk Nutrient Composition of Women from Singapore with a Special Focus on Lipids", American Journal of Human Biology, vol. 25, Issue No. 6, 2013, pp. 770-779.
Nakano et al., "Sialic Acid in Human Milk: Composition and Functions", Acta Paediatr Taiwan, vol. 42, Issue No. 1, 2001, 1 page.
Gurnida et al., "Association of Complex Lipids Containing Gangliosides with Cognitive Development of 6-month-old Infants", Early Human Development, vol. 88, Issue No. 8, 2012, pp. 1-7.
"Dhasco and Arasco Oils as Sources of Long-Chain Polyunsaturated Fatty Acids in Infant Formula", Food Standards Australia New Zealand, Technical Report Series No. 22, 2003, pp. 1-54.
Boswell et al., "Preclinical Evaluation of Single-cell Oils that are Highly Enriched with Arachidonic Acid and Docosahexaenoic Acid", Food and Chemical Toxicology, vol. 34, Issue No. 7, 1996, pp. 585-593.
Pan et al., "Variation of the Ganglioside Compositions of Human Milk, Cow's Milk and Infant Formulas", Early Human Development, vol. 57, Issue No. 1, 2000, pp. 25-31.
Jensen, "Invited Review: The Composition of Bovine Milk Lipids: Jan. 1995 to Dec. 2000", Journal of Dairy Science, vol. 85, Issue No. 2, 2002, pp. 295-350.

(Continued)

Primary Examiner — Lien T Tran
(74) Attorney, Agent, or Firm — K&L Gates LLP (57) ABSTRACT The invention concerns synthetic nutritional formulations, particularly milk based compositions, for infants and children. The compositions are especially adapted to the age of the child, younger or older than three months. The invention further relates to administration of these compositions for promoting the healthy establishment of cognitive function in infant boys and girls and in young boys and girls up to the age of thirty-six months.

9 Claims, 6 Drawing Sheets (56) References Cited

OTHER PUBLICATIONS

Commission Directive 2006/141/EC on Infant Formulae and Follow-on Formulae and Amending Directive 1999/21/EC., Official Journal of the European Union, Dec. 22, 2006, 33 pages.
Newburg, "Glycoblology of Human Milk", Biochemistry (Moscow), vol. 78, Issue No. 7, 2013, pp. 771-785.
"Calculations of Fatty Acids in 100 g Food and 100 g Total Fatty Acids", Food Composition Data, Retrieved from http://www.fao.org/3/y4705e/y4705e22.htm, 2020, 2 pages.
Benoit et al., "Phospholipid Species and Minor Sterols in French Human Milks", Food Chemistry, vol. 120, Issue No. 3, 2010, pp. 684-691, XP26858471.
European Office Action for Application No. 1476164131-1105 dated Jul. 28, 2020.

SYNTHETIC MILK COMPOSITIONS COMPRISING N-6 EICOSATRIENOIC ACID AND POLAR LIPIDS FOR INFANTS YOUNGER AND OLDER THAN THREE MONTHS FOR HEALTHY ESTABLISHMENT OF COGNITIVE FUNCTION

CROSS REFERENCE TO RELATED APPLICATIONS

The present application is a National Stage of International Application No. PCT/EP2014/069131, filed on Sep. 9, 2014, which claims priority to European Patent Application No. 13196804.2, filed Dec. 12, 2013, the entire contents of which are being incorporated herein by reference.

TECHNICAL FIELD

The invention concerns synthetic nutritional formulations, particularly milk based compositions, for infants and children. The compositions are especially adapted to the age of the child. The invention further relates to administration of these compositions for promoting the healthy establishment of cognitive function in infant boys and girls and in young boys and girls up to the age of thirty-six months.

BACKGROUND OF THE INVENTION

Nervous system development and maturation is a highly complex biological phenomenon that involves a number of physiological processes. The nervous system develops during gestation and then refines to a mature, functional network during the post natal period.

Immaturity or delayed maturation of the cerebral cortex may lead to delayed and/or impaired learning ability, loss of, or poor development of higher reasoning, concentration difficulties, delay in language development, memory and executive function problems, decreased intelligence, and thus, poor mental performance. Other disorders, such as mood disorders and disorders linked to the inability to communicate and socialize normally (for example, autism, including Asperger's syndrome), may also result.

This can be observed in infants such as:
Preterm infants, low birth weight (<2500 g), very low and extremely low birth weight infants (<1500 g), and in small for gestational age infants [Allen, M. C. (2008); Neurodevelopmental outcomes of preterm infants, Curr. Opin Neurol., 21(2): 123-8].
Premature or term-born infants having experienced an intrauterine growth retardation (IUGR) that occurred following any adverse events during the gestation (smoking of the mother, medication of the mother, low placenta quality, abnormal placenta positioning, malnutrition of the mother and the foetus, excessive stress/anxiety of the mother, etc); [Gregory, A. et al. (2008); Intrauterine Growth Restriction Affects the Preterm Infant's Hippocampus, Pediatric Research, 63(4): 438-443].
Any neonate and young infant showing nervous system growth retardation following, for example, hypoxemia-ischemia at birth, or any other adverse event [Barrett, R. D. et al. (2007); Destruction and reconstruction: hypoxia and the developing brain, Birth Defects Res. C. Embryo Today, 81: 163-76].

It is known that nutrition plays an important role in neuronal maturation in the brain (reviewed in [Huppi, P. S. (2008); Nutrition for the Brain, Pediatric Research, 63(3): 229-231]). Specifically, clinical studies have shown that essential fatty acids are crucial to ensure foetal and postnatal brain development [Chang, C. Y. et al. (2009); Essential fatty acids and human brain, Acta Neurol. Taiwan, 18(4): 231-41]; [Alessandri, J. M. et al. (2004); Polyunsaturated fatty acids in the central nervous system: evolution of concepts and nutritional implications throughout life, Reprod. Nutr. Dev., 44(6): 509-38].

The consequences of malnutrition can be irreversible and may include poor cognitive development, educability, and thus future economic productivity [Horton, R; (2008) The Lancet, Vol. 371, Issue 9608, page 179; [Laus, M. F. et al. (2011); Early postnatal protein-calorie malnutrition and cognition: a review of human and animal studies, Int. J. Environ. Res. Public Health., 8(2): 590-612].

Thus, oral interventions are an appropriate way to positively impact on the development of the nervous system, so as to promote the healthy establishment of cognitive function and mental performance in infants or young children.

In general, human breast milk represents the uncontested gold standard in terms of infant nutrition. In particular, early breastfeeding and a higher protein intake have been shown beneficial to neuronal maturation in infants (reviewed in [Huppi, P. S. (2008)]. However, in some cases breastfeeding is inadequate or unsuccessful for medical reasons or because of mother choice not to breastfeed. Infant formulae have been developed for these situations.

One approach to designing infant formula has been to try to design formulae that resemble breast milk. However, the complexity of the composition of human milk, much about which is still unknown, makes this approach technically very challenging.

In humans during pregnancy, hormones such as estrogen, progesterone and prolactin lead to glandular proliferation and differentiation, which prepares the mammary glands for milk synthesis. After the birth, the primed mammary glands synthesize milk which is likely to vary according to genetic, environmental, behavioral, dietary and other physiological factors. More specifically, the maternal dietary influence on milk composition is varied and is nutrient specific.

To add to this complexity, human lactation is dynamic, occurring in stages of lactation, changing from early carbohydrate-rich diluted milk to lipid and protein enriched, energy-dense milk at later stages (after 30 days). In humans, early milk or colostrum (1-5 days) is known to be rich in immune factors and mature milk in energy density. Furthermore, Powe and associates [Powe C. E. et al. (2010); Infant sex predicts breast milk energy content, American journal of human biology, 22:50-54] have recently reported differences in energy content based on the gender of the new born infant. Milk secreted from the mothers of male infants was reported to be 25% greater in energy content when compared with the milk of mothers of female infants.

As well as depending on the maturity of lactation, it has been demonstrated that many nutrients in breast milk are dependent on the time of the day the milk is sampled (diurnal variations), whether only a part of feeding (pre-, mid-, or hind-milk) or whole breast milk was collected, whether left or the right breast was drained [Jensen R G., (1999), Lipids in Human Milk, Lipids 34, 1243-1271]. In terms of human milk characterization, whereas there are many reports in the prior art on the relative amounts of nutrients, including fatty acids and phospholipids (expressed as g per 100 g of phospholipids) in breast milk [Sala-Vila A., et al (2005), Lipid composition in human breast milk from Granada (Spain): Changes during lactation, Nutrition 21, 467-473], there is very little data on the absolute quantities (for example of phospholipids). Thus, the level of intake by the infant of the nutrients remains largely unknown.

Given the complexity of breast milk composition, it remains very challenging to develop synthetic nutritional compositions based on breast milk composition.

There is a need to provide nutritional interventions that meet the nutritional needs of infants and young children. In particular, there is a need to provide nutritional interventions that are adapted to the distinct nutritional needs of infants and young children as they grow. There is a need to provide nutritional interventions that take into account the age of the child, specifically in months, for example 0-3, 3-6, 6-12 months etc.

There is a need to provide compositions that promote and support the healthy establishment of cognitive function, during the early phases of newborn life, when the nervous system is rapidly maturing.

The present inventors have designed synthetic nutritional compositions that are especially adapted to meet the needs of infants and young children as they evolve in the first months of life. The compositions of the present invention have been designed to ensure the healthy establishment of cognitive function.

SUMMARY OF THE INVENTION

The present invention concerns synthetic nutritional formulations for infants and young children, meaning in the context of the invention, up to the age of 36 months. The compositions are especially adapted to the age of the child. The invention further relates to administration of these compositions for promoting the healthy establishment of cognitive function in infants and young children.

In a first aspect of the invention, there is provided a synthetic nutritional composition especially adapted to the nutritional needs of infants less than three months old. The composition comprises:

a. 13.8-17 mg/100 ml n-6 eicosatrienoic,
 b. 0.2-0.25 mg/100 ml disialogangliosides 3 (GD3),
 c. 0.2-0.25 mg/100 ml monosialoganglioside-3 (GM3),
 d. GM-3 and GD-3 in a GM3:GD-3 ratio of 1.1 to 1.45, and
 e. 0.4-0.52 mg/100 ml GD-3+GM-3.

In a preferred embodiment, the composition may also comprise:

f. 7.6-9.3 mg/100 ml of sphingomyelin.

In another preferred embodiment, the composition may also comprise one or a mixture of phospholipids g.-j.:

g. 5.4-6.6 mg/100 ml of phosphotitdylcholine,
 h. 6.0-7.5 mg/100 ml of phosphotitdylethanolamine,
 i. 1-1.2 mg/100 ml of phosphotitdylinositol, and
 j. 0.7-0.8 mg/100 ml of phosphotitdylserine.

In a second aspect of the invention, there is provided a synthetic nutritional composition especially adapted to the nutritional needs of an infant or young child of more than three months old. The composition comprises:

a. 9.5-11.7 mg/100 ml n-6 eicosatrienoic acid,
 b. 0.15-0.20 mg/100 ml GD-3,
 c. 0.34-0.44 mg/100 ml GM-3,
 d. GM-3 and GD-3 in a GM3:GD-3 ratio of 5.2 to 6.6, and
 e. 0.50-0.62 mg/100 ml GD-3+GM-3.

In a preferred embodiment of this second aspect of the invention the synthetic nutritional composition also comprises:

f. 7.8-9.6 mg/100 ml of sphingomyelin.

In another preferred embodiment of this second aspect of the invention, the synthetic nutritional composition also comprises any one or a mixture of phospholipids g.-j.:

g. 4.4-5.4 mg/100 ml of phosphotitdylcholine,
 h. 7.3-9.0 mg/100 ml of phosphotitdylethanolamine,
 i. 1.0-1.2 mg/100 ml of phosphotitdylinositol, and
 j. 0.8-1.0 mg/100 ml of phosphotitdylserine.

The synthetic nutritional compositions may be in an infant formula in the form of a powder, liquid or concentrated liquid, or is a human milk fortifier.

In a third aspect of the invention, there is provided a set of two distinct synthetic nutritional compositions, wherein the first composition is especially adapted to the nutritional needs of an infant or young child younger than three months, as described according to the first aspect of the invention. The second composition as described according to the first aspect of the invention is especially adapted to the nutritional needs of an infant or young child older than three months.

The compositions according to the invention are especially adapted to promote the healthy establishment of cognitive function in infants and young children. According to a preferred embodiment of the invention, the compositions according to the first aspect of the invention and the first composition in the sets of nutritional compositions according to the third aspect of the invention are targeted to promote the healthy establishment of cognitive function in an infant or young child younger than three months. According to another preferred embodiment of the invention, the compositions according to the second aspect of the invention and the second composition in the sets of nutritional compositions according to the third aspect of the invention are targeted to promote the healthy establishment of cognitive function in an infant or young child older than three months.

In a preferred embodiment, the synthetic nutritional compositions of the invention may be an infant formula in the form of a powder, liquid or concentrated liquid, or is a human milk fortifier, or a growing-up milk. In a preferred embodiment, the infant formula is a cow's milk whey-based formula.

BRIEF DESCRIPTION OF THE FIGURES

FIGS. 1-3 show the results of the analysis of nutrients in the breast milk of 50 mothers in trial detailed in Example 1. Samples were taken at 30, 60 and 120 days post-partum. Quantities were measured in mg/100 ml. The measurements of milk of mothers to boys are shown with a dashed line, while the solid line shows the measurements of milk of mothers to girls. The P[gender] value relates to the differences in milk with respect to the sex of the baby. The P[age] values are differences in gender with respect to time; P[age] is a P value considering a linear model and P[age$^2$] using a quadratic model.

DETAILED DESCRIPTION

For a complete understanding of the present invention and the advantages thereof, reference is made to the following detailed description of the invention.

It should be appreciated that various embodiments of the present invention can be combined with other embodiments of the invention and are merely illustrative of the specific ways to make and use the invention and do not limit the scope of the invention when taken into consideration with the claims and the following detailed description.

In the present description, the following words are given a definition that should be taken into account when reading and interpreting the description, examples and claims.

Definitions

Infants: according to the Commission Directive 2006/141/EC of 22 Dec. 2006 on infant formulae and follow-on formulae, article 1.2 (a), the term "infants" means children under the age of 12 months.

Young Children (including young boys and girls): according to the Commission Directives 2006/141/EC of 22 Dec. 2006 and/or 91/321/EEC of 14 May 1991 on infant formulae and follow-on formulae, article 1.2 (b), the term "young children" means children aged between one and three years.

Infant formulae: according to the Commission Directives 2006/141/EC of 22 Dec. 2006 and/or 91/321/EEC of 14 May 1991 on infant formulae and follow-on formulae, article 1.2 (c), the term "infant formulae" means foodstuffs intended for particular nutritional use by infants during the first four to six months of life and satisfying by themselves the nutritional requirements of this category of persons. It has to be understood that infants can be fed solely with infant formulas, or that the infant formula can be used by the carer as a complement of human milk. It is synonymous to the widely used expression "starter formula".

Follow-on formulae: according to the Commission Directives 2006/141/EC of 22 Dec. 2006 and/or 91/321/EEC of 14 May 1991 on infant formulae and follow-on formulae, article 1.2 (d), the term "follow-on formulae" means foodstuffs intended for particular nutritional use by infants aged over four months and constituting the principal liquid element in a progressively diversified diet of this category of persons.

Growing-up milk: milk-based nutritional composition especially adapted to a child of between one year and three years old.

Human Milk fortifier: Nutritional composition for infants or young children intended to be added to or diluted with human milk.

The term "hypoallergenic composition" means a composition which is unlikely to cause allergic reactions.

The term "sialylated oligosaccharide" means an oligosaccharide having a sialic acid residue.

The term "fucosylated oligosaccharide" means an oligosaccharide having a fucose residue.

The term "prebiotic" means non-digestible carbohydrates that beneficially affect the host by selectively stimulating the growth and/or the activity of healthy bacteria such as bifidobacteria in the colon of humans [Gibson G R, Roberfroid M B. *Dietary modulation of the human colonic microbiota: introducing the concept of prebiotics*. J Nutr. 1995; 125:1401-12].

The term "probiotic" means microbial cell preparations or components of microbial cells with a beneficial effect on the health or well-being of the host [Salminen S, Ouwehand A. Benno Y. et al. *"Probiotics: how should they be defined"* Trends Food Sci. Technol. 1999:10 107-10].

All percentages are by weight unless otherwise stated.

As used in this specification, the words "comprises", "comprising", and similar words, are not to be interpreted in an exclusive or exhaustive sense. In other words, they are intended to mean "including, but not limited to".

Any reference to prior art documents in this specification is not to be considered an admission that such prior art is widely known or forms part of the common general knowledge in the field.

The present inventors have carried out a major study on breast milk composition. This study involved both developing advanced analytical technologies to analyze milk samples and performing a longitudinal clinical trial with human milk sampling at 30, 60 and 120 days post-partum (see Example 1). The milk samples were quantitatively analyzed for macronutrients, fatty acids, phospholipids and gangliosides. The inventors have surprisingly found very significant differences over time (between 0-120 days) in the levels of nutrients. These differences were significant for certain fatty acids, phospholipids and gangliosides.

Figure 1A:
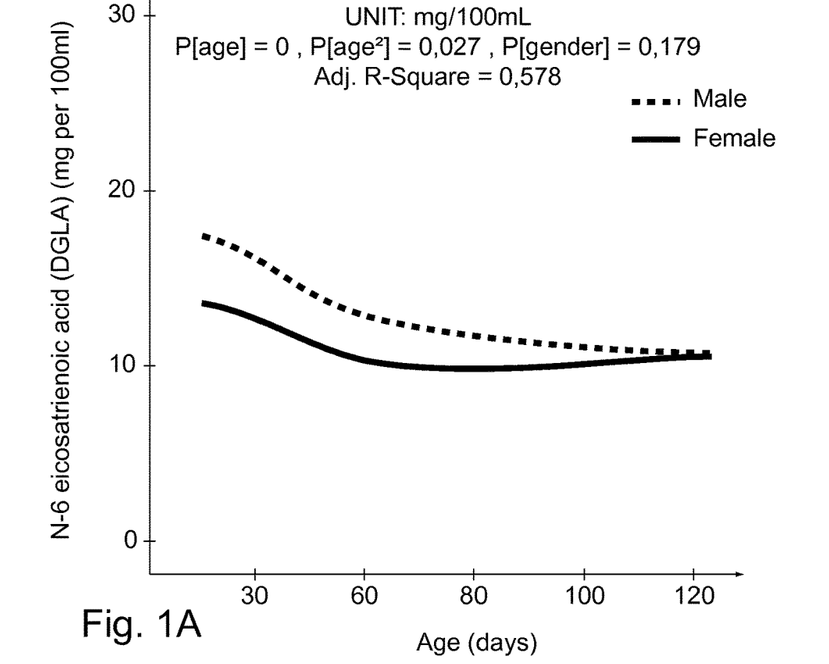
FIG. 1A shows n-6 eicosatrienoic acid.
Figure 1B:
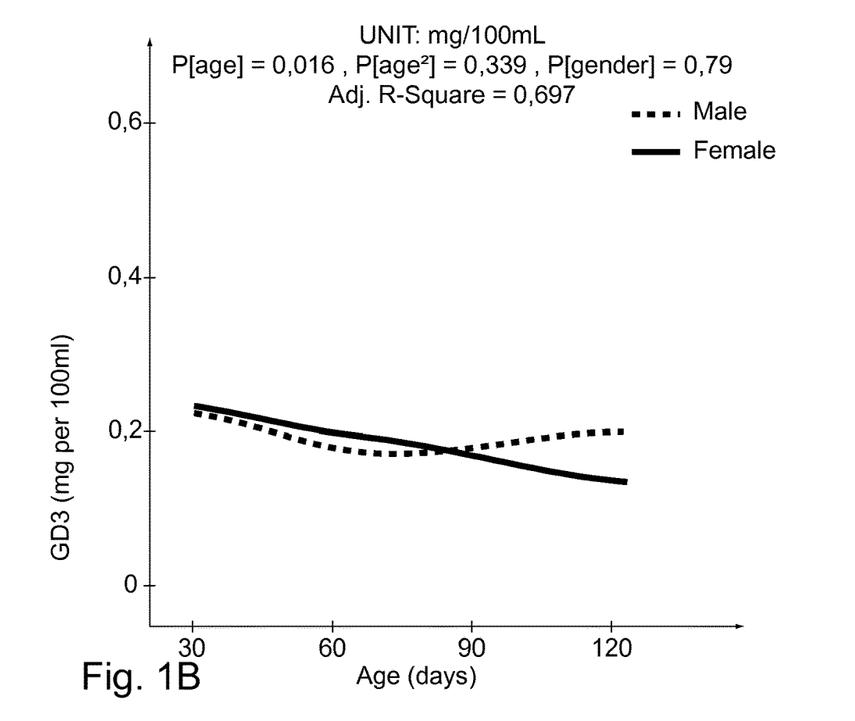
FIG. 1B shows disialogangliosides 3 (GD3)
Figure 1C:
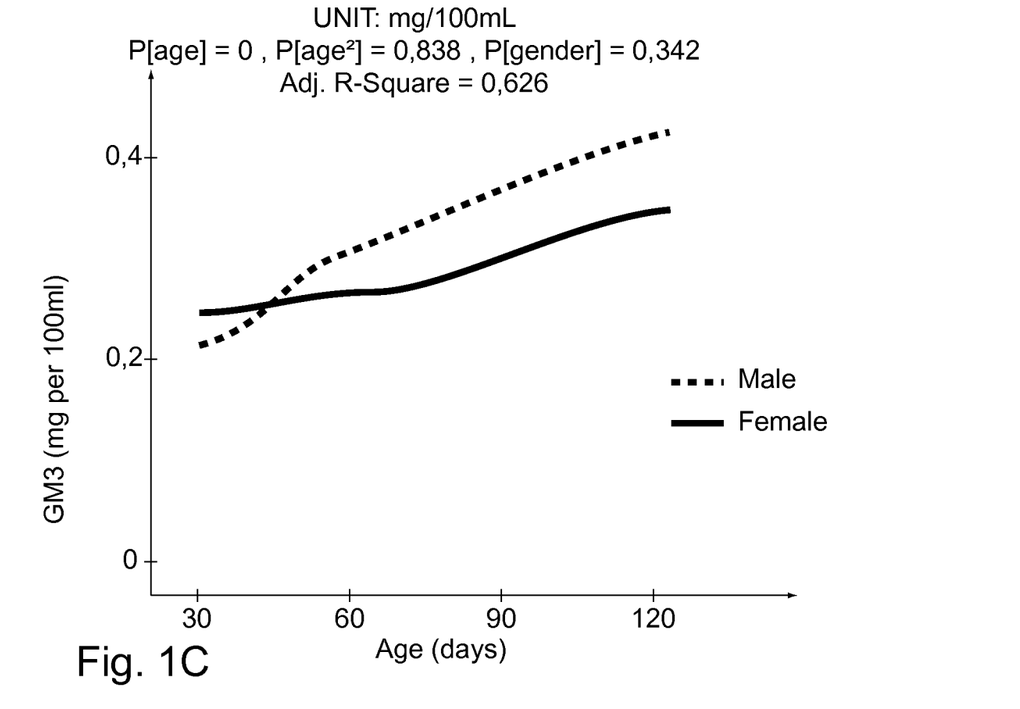
FIG. 1C shows monosialoganglioside 3 (GM3), FIG. 1D GM3:GD3 ratio.
Figure 1D:
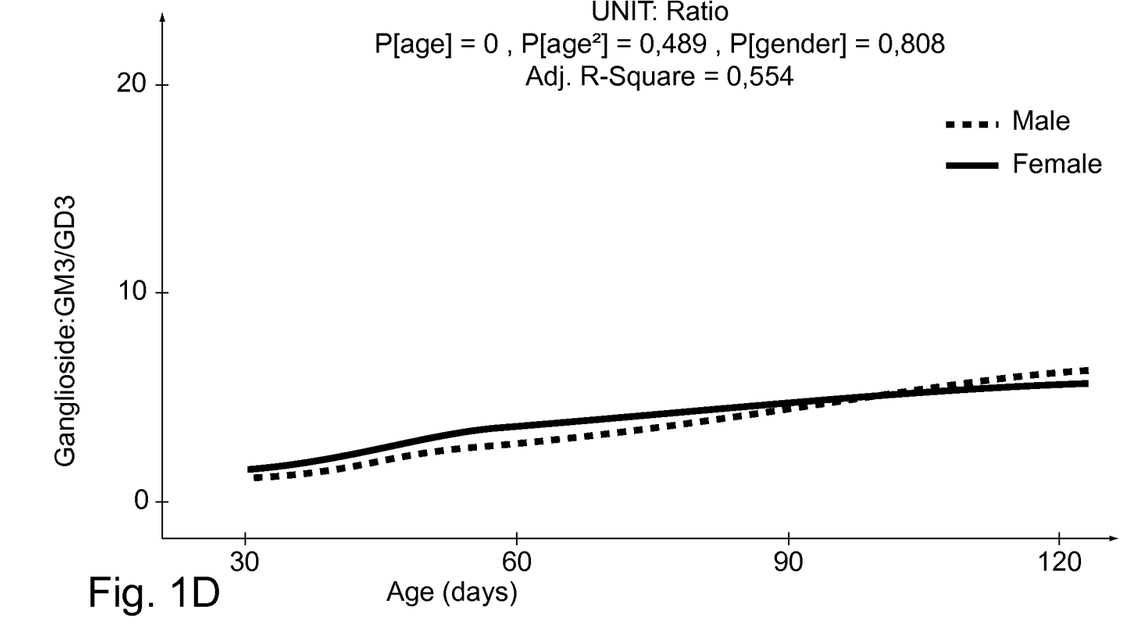
Figure 1E:
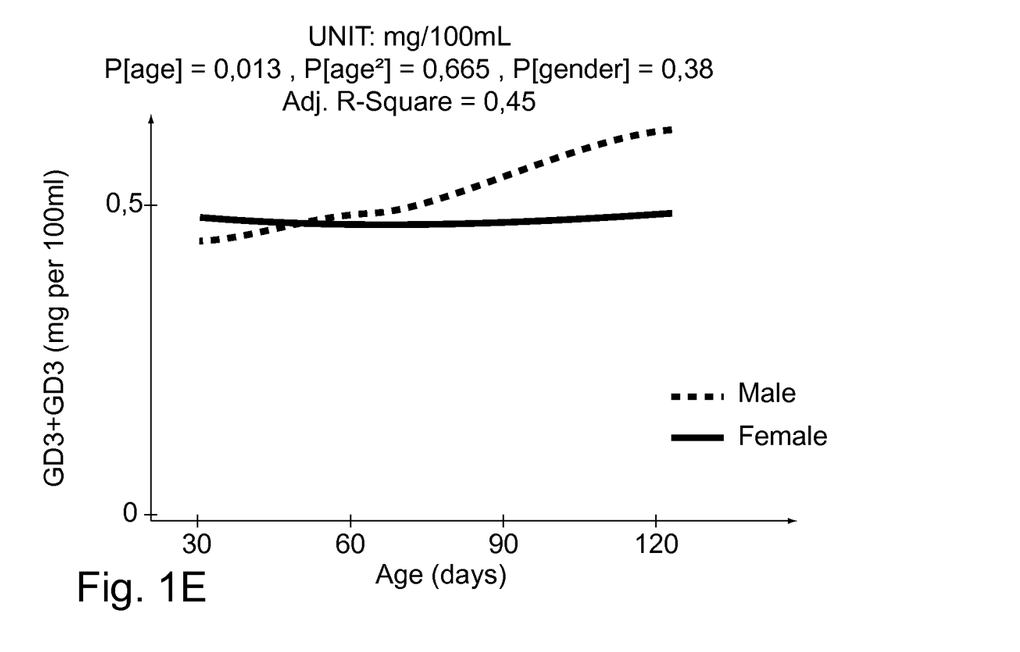
FIG. 1E shows the sum GD-3+GM-3.
Figure 2:
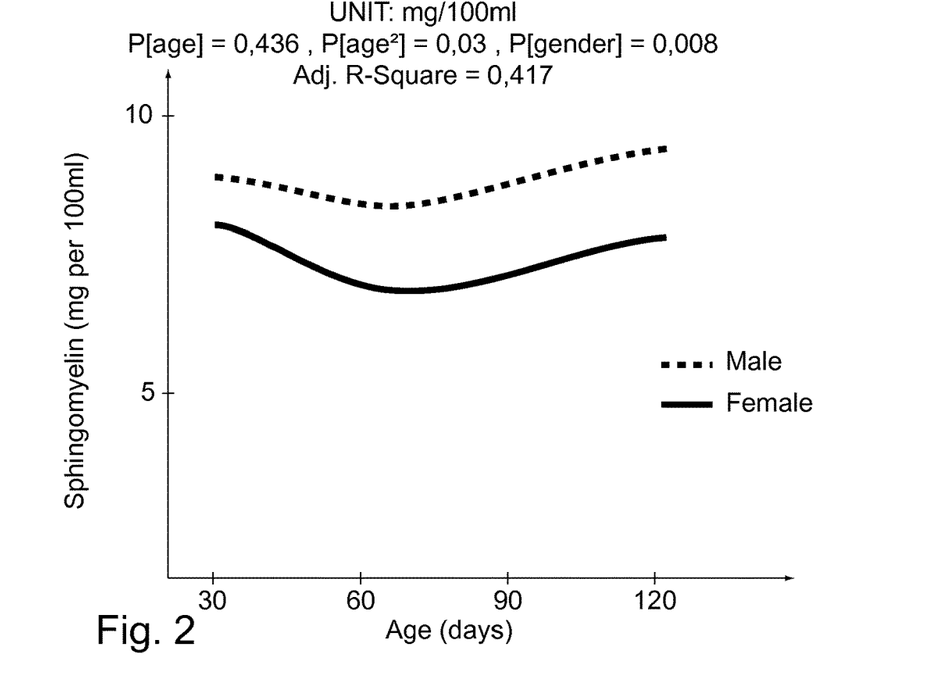
FIG. 2 shows sphingomyelin (SM)
Figure 3A:
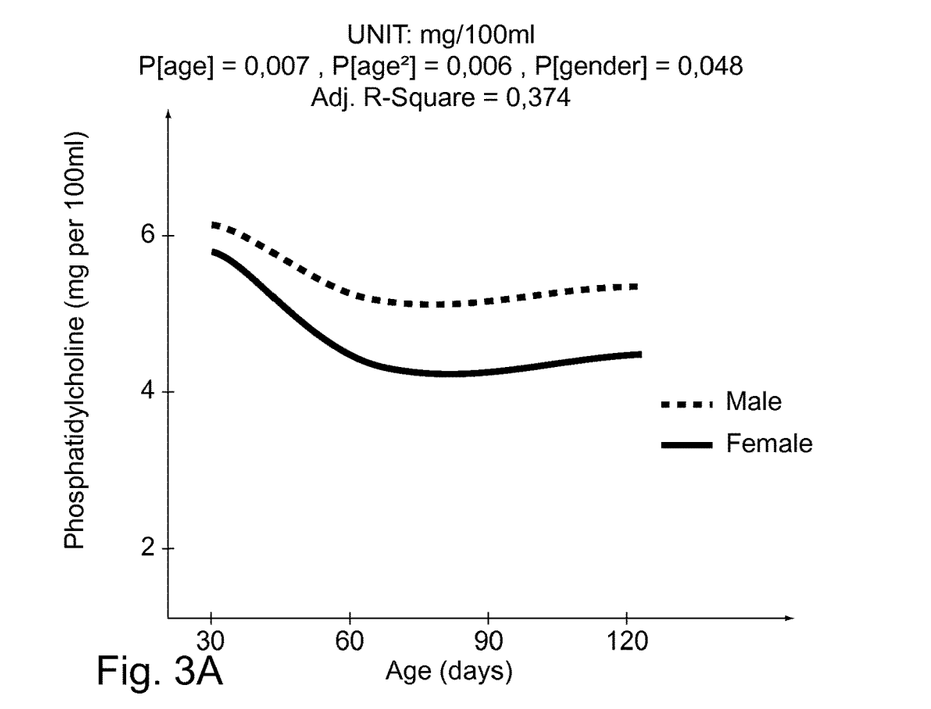
FIG. 3A shows phosphatidylcholine.
Figure 3B:
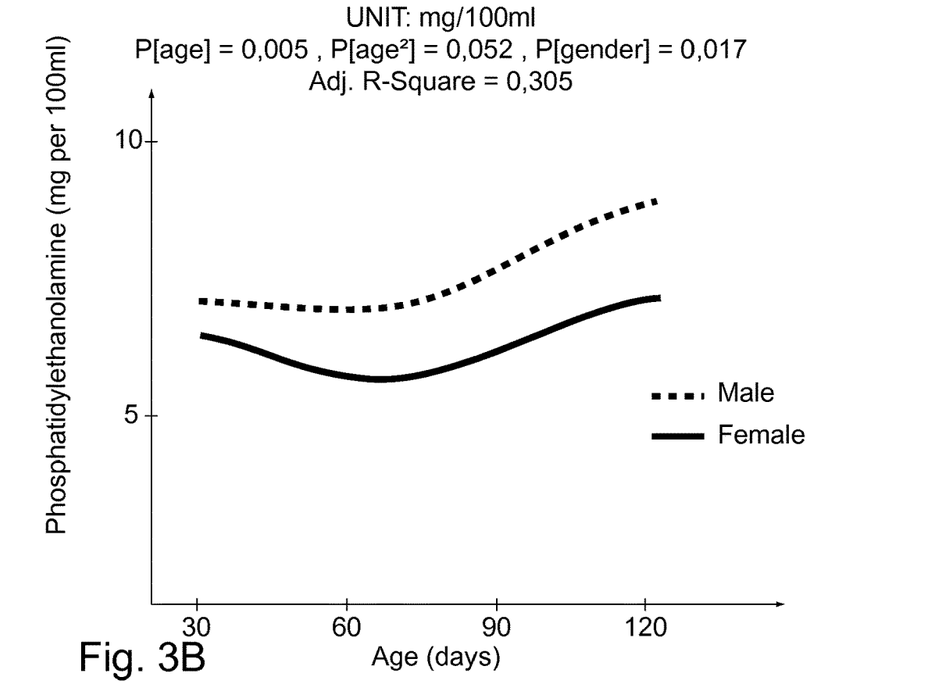
FIG. 3B shows phosphatidylethanolamine.
Figure 3C:
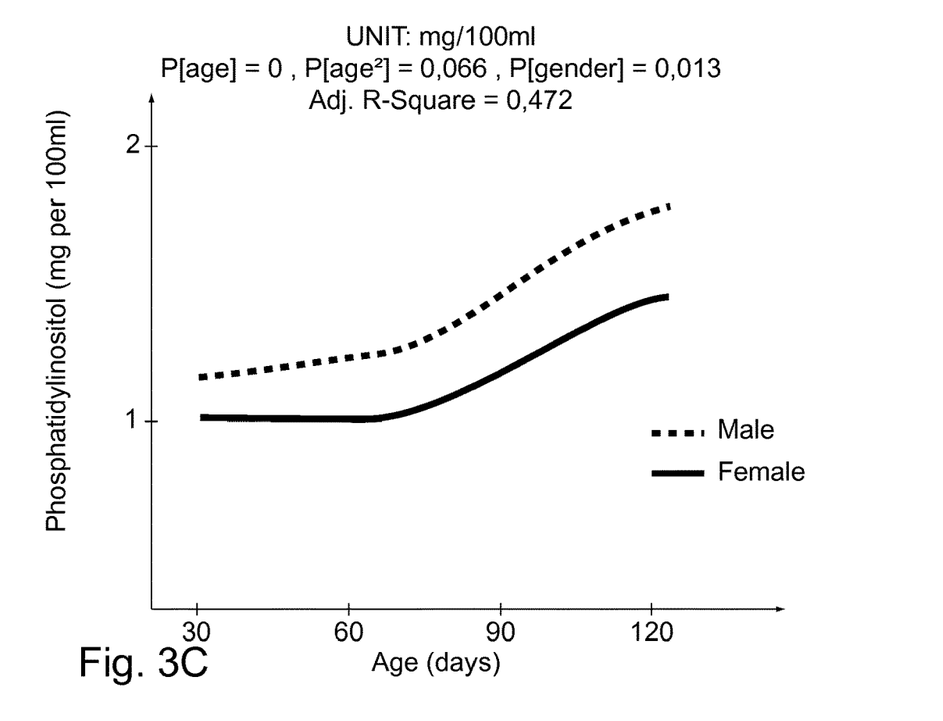
FIG. 3C shows phosphatidylinositol.
Figure 3D:
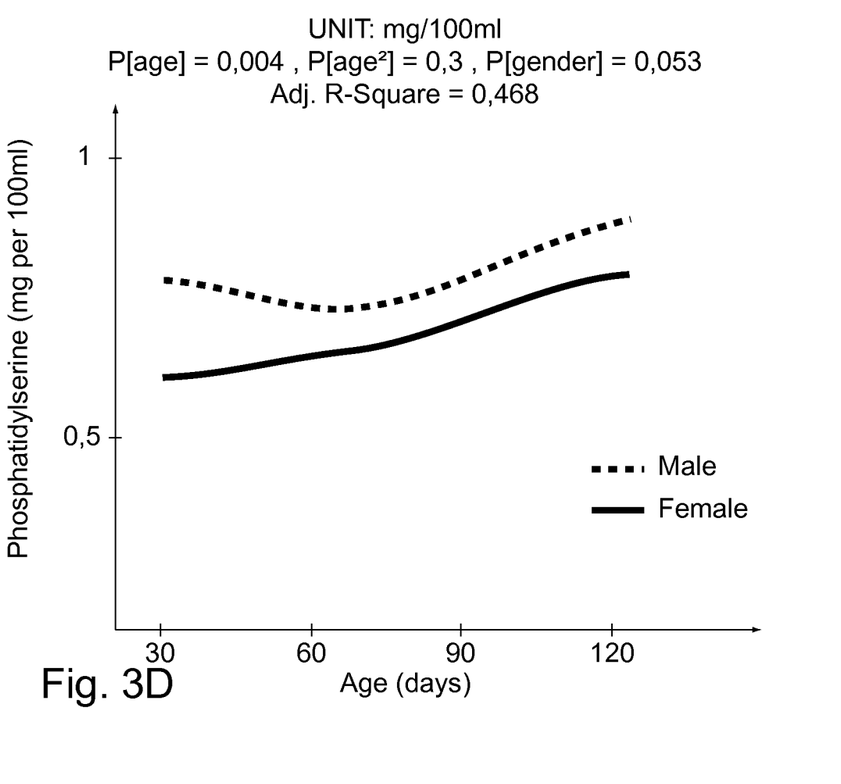
FIG. 3D shows phosphatidylserine.

The results of this trial indicated surprisingly significant differences in the levels of n-6 eicosatrienoic (also known as DGLA), monosialoganglioside 3 (GM3), the sum of GM3 and disialogangliosides 3 (GD3), the ration of GM3 to GD-3, sphingomyelin, phosphatidylcholine, phosphatidylethanolamine, phosphatidylinositol and phosphatidylserine (see Table 2 and FIGS. 1-3).

Based upon the results of this study, the inventors have designed compositions that are especially adapted to meet the nutritional needs of infants and young children who are either younger or older than three months. To the inventor's knowledge, to date, no such age-specific formulations for infants or young children are known.

The Compositions According to the Invention:

The compositions of the invention are designed to meet the nutritional needs of infants and young children who are younger than three months old or between three and thirty-six months old. The compositions promote healthy establishment cognitive function in these infants or young children.

The synthetic nutritional compositions of the invention may be an infant formula in the form of a powder, liquid or concentrated liquid. The infant formula may be based on a cow's milk, goat's milk or buffalo milk. The infant formula may be a starter formula for infants that are less than 6 months old or a follow-on formula for infants that are more than 6 months old. The composition of the invention may be a growing up milk, or a human milk fortifier. In a preferred embodiment, the composition may be cow's milk whey based infant formula. The formula may also be a hypoallergenic (HA) formula in which the cow milk proteins are (partially or extensively) hydrolysed. The formula may also be based on soy milk or a non-allergenic formula, for example one based on free amino acids.

The nutritional compositions of the invention contain specific quantities of an essential polyunsaturated fatty acid (PUFA) known as n-6 eicosatrienoic acid (also known as di-gamma linolenic acid, or DGLA) depending on whether the composition is for infant of less than 3 months or infant or young children who are older than 3 months. Quantities of the gangliosides monosialoganglioside-3 (GM3), disialogangliosides 3 (GD3), as well as the sum of GM3 and GD3 and the ratio between the two gangliosides also vary depending on whether the composition is for infants who are younger or older than 3 months old. Quantities of sphingomyelin, phospholipids phosphatidylcholine, phosphatidylethanolamine, phosphatidylinositol and phosphatidylserine also vary.

All of the latter components—essential fatty acids, gangliosides, sphingomyelin and phospholipids are known to be involved in cognitive function development.

The quantities of all the nutrients expressed herein as mg/100 ml or g/100 ml reflect the amounts of nutrients present in the final liquid product, to be consumed by the infant or young child. For example, the composition may be a powdered infant formula that is diluted with water to give a final liquid product. The composition according to the invention may also be a concentrated liquid that is diluted with water to achieve the final liquid product. The composition of the invention may be a liquid product that is directly consumed by the infant or child as is. The composition according to the invention may be a human milk fortifier that is added to or diluted with human milk. In this case, the concentration of the nutrients already present in the human milk (to which the human milk fortifier is added) are to be taken as the average values for lactating mothers that are known or predicted from published clinical data.

In a first aspect of the invention, there is provided a synthetic nutritional composition especially adapted to the nutritional needs of infants less than three months old. The composition comprises:
  a. 13.8-17 mg/100 ml, preferably 15-16 mg/100 ml, n-6 eicosatrienoic acid,
  b. 0.2-0.25 mg/100 ml, preferably 0.21-0.24 mg/100 ml, disialogangliosides 3 (GD3),
  c. 0.2-0.25 mg/100 ml, preferably 0.21-0.23 mg/100 ml, monosialoganglioside-3 (GM3),
  d. GM-3 and GD-3 in a GM3:GD-3 ratio of 1.1 to 1.45, preferably 1.2-1.35, and
  e. 0.4-0.52 mg/100 ml, preferably 0.45-0.5 mg/100 ml GD-3+GM-3.

In a preferred embodiment, the composition may also comprise:
  f. 7.6-9.3 mg/100 ml, preferably 8.2-8.7 mg/100 ml, of sphingomyelin.

In another preferred embodiment, the composition may also comprise one or a mixture of phospholipids g.-j.:
  g. 5.4-6.6 mg/100 ml, preferably 5.9-6.1 mg/100 ml, of phosphotitdylcholine,
  h. 6.0-7.5 mg/100 ml, preferably 6.7-7.0 mg/100 ml, of phosphotitdylethanolamine,
  i. 1-1.2 mg/100 ml, preferably 1.1 mg/100 ml, of phosphotitdylinositol, and
  j. 0.7-0.8 mg/100 ml, preferably 0.75 mg/100 ml, of phosphotitdylserine.

In a second aspect of the invention, there is provided a synthetic nutritional composition especially adapted to the nutritional needs of an infant or young child of more than three months old. The composition comprises:
  a. 9.5-11.7 mg/100 ml, preferably 10-11 mg/100 ml, n-6 eicosatrienoic acid,
  b. 0.15-0.19 mg/100 ml, preferably 0.16-0.18 mg/100 ml, GD-3,
  c. 0.34-0.44 mg/100 ml, preferably 0.38-0.41 mg/100 ml, GM-3,
  d. GM-3 and GD-3 in a GM3:GD-3 ratio of 5.2 to 6.6, preferably 5.9-6.1, and
  e. 0.50-0.62 mg/100 ml, preferably 0.54-0.56 mg/100 ml, GD-3+GM-3.

In a preferred embodiment of this second aspect of the invention the synthetic nutritional composition also comprises:
  f. 7.8-9.6 mg/100 ml of sphingomyelin.

In another preferred embodiment of this second aspect of the invention, the synthetic nutritional composition also comprises any one or a mixture of phospholipids g.-i.:
  g. 4.4-5.4 mg/100 ml, preferably 4.7-5.1 mg/100 ml, of phosphotitdylcholine,
  h. 7.3-9.0 mg/100 ml, preferably 7.9-8.3 mg/100 ml, of phosphotitdylethanolamine,
  i. 1.0-1.2 mg/100 ml, preferably 1.5-1.9 mg/100 ml, of phosphotitdylinositol, and
  j. 0.8-1.0 mg/100 ml, preferably 0.87-0.92 mg/100 ml, of phosphotitdylserine.

The synthetic nutritional compositions may be in an infant formula in the form of a powder, liquid or concentrated liquid, or is a human milk fortifier.

In a third aspect of the invention, there is provided a set of two distinct synthetic nutritional compositions, wherein the first composition is especially adapted to the nutritional needs of an infant or young child younger than three months, as described according to the first aspect of the invention. The second composition as described according to the first aspect of the invention is especially adapted to the nutritional needs of an infant or young child older than three months.

The first and second compositions are distinct in that they differ by at least 10% in the quantity of at least one of the common component chosen among a. to j.

The first and second compositions are conditioned separately. The first and second compositions in the set are commercialized under the same marketing concept umbrella. The first and second compositions may be then conditioned separately, or group together in another outer container, or packaging. The packaging may be for example simply a layer or plastic film, a bag, box, piece of foil, or other means to keep the first and second compositions grouped together.

The set may comprise additional third, fourth and fifth etc. compositions that are especially adapted to meet the nutritional needs of infants or young children that are for example, 3-6 months old 6-9 months old or 9-12 months old. The set may also contain additional compositions that target in the same way children older than one year up to three years old.

The set of the invention can preferably be commercialized under the same marketing concept (for example age segmentation and/or specific adaptation of nutritional compositions for infants or children at specific age).

Other Ingredients in the Compositions:

Other standard ingredients known to the skilled person for formulating an infant formula, human milk fortifier or growing-up milk may also be present in the compositions of the invention.

The nutritional compositions of the invention may contain other ingredients which may act to enforce the technical effect of the components a.-k.

Prebiotics:

The prebiotics that may be used in accordance with the present invention are not particularly limited and include all food substances that promote the growth of probiotics or health beneficial micro-organisms in the intestines. Preferably, they may be selected from the group consisting of oligosaccharides, optionally containing fructose, galactose, mannose; dietary fibers, in particular soluble fibers, soy fibers; inulin; or mixtures thereof. Preferred prebiotics are fructo-oligosaccharides (FOS), galacto-oligosaccharides (GOS), isomalto-oligosaccharides (IMO), xylo-oligosaccharides (XOS), arabino-xylo oligosaccharides (AXOS), mannan-oligosaccharides (MOS), oligosaccharides of soy, glycosylsucrose (GS), lactosucrose (LS), lactulose (LA), palatinose-oligosaccharides (PAO), malto-oligosaccharides, gums and/or hydrolysates thereof, pectins and/or hydrolysates thereof.

In particular, the human milk oligosaccharides, for example sialylated oligosaccharides, described in WO 2012/069416 published on May 31, 2012 may be included in the composition according to the invention. The latter oligosaccharides may act in synergy with the essential fatty acids and phospholipids of the invention to promote the healthy establishment of cognitive function in the young developing infant or young child.

Probiotics may be added to the composition. All probiotic micro-organisms may be added additionally. Preferably, the probiotic may be selected for this purpose from the group consisting of *Bifidobacterium, Lactobacillus, Lactococcus, Enterococcus, Streptococcus, Kluyveromyces, Saccharoymces, Candida*, in particular selected from the group consisting of *Bifidobacterium longum, Bifidobacterium lactis, Bifidobacterium animalis, Bifidobacterium breve, Bifidobacterium infantis, Bifidobacterium adolescentis, Lactobacillus acidophilus, Lactobacillus casei, Lactobacillus paracasei, Lactobacillus salivarius, Lactobacillus lactis, Lactobacillus rhamnosus, Lactobacillus johnsonii, Lactobacillus plantarum, Lactobacillus salivarius, Lactococcus lactis, Enterococcus faecium, Saccharomyces cerevisiae, Saccharomyces boulardii* or mixtures thereof, preferably selected from the group consisting of *Bifidobacterium longum* NCC3001 (ATCC BAA-999), *Bifidobacterium longum* NCC2705 (CNCM I-2618), *Bifidobacterium longum* NCC490 (CNCM I-2170), *Bifidobacterium lactis* NCC2818 (CNCM I-3446), *Bifidobacterium breve* strain A, *Lactobacillus paracasei* NCC2461 (CNCM I-2116), *Lactobacillus johnsonii* NCC533 (CNCM I-1225), *Lactobacillus rhamnosus* GG (ATCC53103), *Lactobacillus rhamnosus* NCC4007 (CG MCC 1.3724), *Enterococcus faecium* SF 68 (NCC2768; NCIMB10415), and mixtures thereof.

In one embodiment the synthetic nutritional compositions of the invention comprise probiotics active or inactivated, dead or alive, preferably in sufficient dose to be effective (e.g between $10^6$ to $10^{11}$ or between $10^7$ and $10^9$ cfu/g of composition). In one embodiment the first composition for infant of less than 3 months of the invention comprises a probiotic having a specific effect for that age and is different from the probiotic comprised in the second composition for infant of more than 3 months of the invention. In one embodiment such probiotics comprise *Lactobacillus rhamnosus* in the first composition and *B. Longum* in the second composition (or possibly vice-versa). In one embodiment such probiotics comprise *Bifidobacterium lactis* the first composition and *Lactobacillus rhamnosus* in the second composition (or possibly vice-versa). The choice of probiotics is specifically adapted for the particular needs of the infants at specific age.

Vitamins, minerals and other micronutrients suitable for administration to children under the age of three may be added to the compositions of the invention.

The Compositions of the Invention Promote the Healthy Establishment of Cognitive Function:

The nutrients of the compositions of the invention are especially associated with brain maturation, especially the development of cognitive function in young mammals.

ALA (α-linolenic acid), an omega-3 fatty acid, and LA (linoleic acid), an omega-6 fatty acid, cannot be synthesized by humans and thus must be obtained from the diet.

Additionally, two long-chain omega-3 fatty acids, eicosapentaenoic acid (EPA) and docosahexaenoic acid (DHA), can be synthesized from ALA. There are many reports in the literature suggesting that these fatty acids may be essential for optimal cognitive function development. Among its many roles, DHA influences the function of the blood-brain barrier, the activity of membrane-bound enzymes and ionic channels, dopaminergic and serotoninergic neurotransmission, and signal transduction [Yaboob, P Annu. Rev. Nutr. 2009.29:257-282].

Ganglioside accretion in the developing brain is highest in utero and in early neonatal life, during the periods of dendritic branching and new synapse formation. Further, brain contains the highest relative ganglioside content in the body, particularly in neuronal cell membranes concentrated in the area of the synaptic membrane. Gangliosides are known to play a role in neuronal growth, migration and maturation, neuritogenesis, synaptogenesis, and myelination [McJarrow, P., (2009) Nutr. Rev. August; 67(8):451-63].

Choline found in phospholipids is the precursor to the neurotransmitter acetylcholine. Loss of cholinergic neurons is associated with impaired cognitive function [Poly et al. (2011) Am. J. Clin. Nutr., 94(6):1584-91].

Sphingomyelin is a type of sphingolipid found in animal cell membranes, especially in the membranous myelin sheath that surrounds some nerve cell axons.

Thus, the compositions according to the invention are especially adapted to promote the healthy establishment of cognitive function in infants and young children. By "healthy establishment of cognitive function", it is meant that the cognitive function of the infant or young child, as measured by a standard method, is in the normal range.

Standard methods known to the skilled person are the Bayley Scales of Infant and Toddler Development® (currently Third Edition (Bayley-III)). This test includes cognitive, language, motor, social-emotional and general adaptive features. Raw scores of successfully completed items are converted to scale scores and to composite scores. These scores are used to determine the child's performance compared with norms taken from typically developing children of their age (in months). The percentile scores between 85 and 115 are usually accepted as normal cognitive development [Black M. M. and Matula K. (1999), Essentials of Bayley Scales of Infant Development II, Assessment, New York: John Wiley, ISBN 978-0-471-32651-9].

Another scale that may be used to measure cognitive function is the Griffiths Scale [Chaudhary T, et al. (2012), *Predictive and Concurrent Validity of Standardized* Neurodevelopmental Examinations by the Griffiths Scales and Bayley Scales of Infant Development II., Klin Pediatr., December 2012].

According to a preferred embodiment of the invention, the compositions according to the first aspect of the invention and the first composition in the sets of nutritional compositions according to the third aspect of the invention, target infants younger than three months. According to another preferred embodiment of the invention, the compositions according to the second aspect of the invention and the second composition in the sets of nutritional compositions according to the third aspect of the invention, target infants and young children older than three months and younger than thirty-six months.

In one embodiment the nutritional compositions of the invention are for infants that have experienced IUGR, and/or had a low, very low, or extremely low birth weight, is small for gestational age, and/or is suffering or suffered from cognitive function impairment either in utero or, during, or after birth.

The invention is further described with reference to the following examples. It will be appreciated that the invention as claimed is not intended to be limited in any way by these examples.

Although the invention has been described by way of example, it should be appreciated that variations and modifications may be made without departing from the scope of the invention as defined in the claims. Furthermore, where known equivalents exist to specific features, such equivalents are incorporated as if specifically referred in this specification.

EXAMPLES

Example 1

Longitudinal Clinical Trial:

The present inventors designed a longitudinal clinical trial with 50 lactating mothers with milk sampling at 30 (visit 1), 60 (visit 2) and 120 (visit 3) days post-partum. The milk samples were quantitatively analyzed for energy and total solids.

Human milk collection: The protocol and collection of human milk was reviewed and approved by the local ethical committee of Singapore. The study took place at National University of Singapore. Volunteer mothers of term infants, who were apparently healthy and non-smokers (n=50; 31.1±3.1-year old) provided breast milk samples (approximately 30 mL; 4 weeks post-partum). Samples were collected after full expression from one breast using milk pump and while the baby was fed on the other breast. All efforts were made to collect complete feed that included fore-milk, mid-milk and hind-milk as a representation of one feed and to avoid within feed variation of lipid content. Approximately 30 mL aliquot was separated in a conical polypropylene tube for this study and the rest was fed to the infant. Samples collected for research were stored at −80° C. until analyses.

Macronutrient Analysis by Mid-Infrared (MIR) Assay: The MIR analyses were performed with the Human Milk Analyzer (HMA, Miris, Sweden). The HMA is based on a semisolid MIR transmission spectroscopy, designed specifically for determination of the macronutrient composition of human milk. The use of the machine was according to manufacturer's instructions. Briefly 1 mL of previously warmed milk sample (up to 40° C. in water bath) was sonicated for 1 min before manual injection to the milk inlet. The analysis was conducted within next minute before the milk was retrieved and the inlet washed with de-ionized water. The cell was also washed with supplied detergent every 5 sample injections. Also every 10 samples an in-house control as well as calibrating standard provided by Miris were ran for quality control purposes.

Fatty Acid Analysis: Fatty acid methyl esters (FAMEs) were prepared using HCl/Methanol (3N) as a catalyst. The methylation procedure was as follows: In a 15 mL test tube equipped with Teflon-lined screw caps, 250 µL of human milk was added followed by 300 µL of internal standard FAME 11:0 and 300 µL of internal standard TAG 13:0, 2 mL of methanol, 2 mL of methanol/HCL (3N) and 1 mL of n-hexane. Test tubes were firmly capped, shaken vigorously and heated at 100° C. for 60 min, with occasional additional shaking. Care was taken to fit the cap tightly with cap liner to avoid leaks when tubes are heated at 100° C. After cooling down to room temperature, 2 mL water is added and shaken vigorously for centrifugation at 1200 g for 5 min followed by the transfer of the upper phase (hexane) into GC vials. For optimal GLC separation, the use of a long (100 m), highly polar capillary column is recommended. These columns allow accurate separation of FAME, including the cis and trans isomers. GLC analyses were performed according to standard conditions known to the skilled person. A 7890A gas-chromatograph with a 7693 autosampler with preparative station module (Agilent Technologies, Palo Alto, Calif.) equipped with a fused-silica CP-Sil 88 capillary column (100% cyanopropylpolysiloxane; 100 m, 0.25 mm id, 0.25 µm film thickness; Agilent, Palo Alto, Calif.) was used with a split injector (1:25 ratio) heated at 250° C. and a flame-ionization detector operated at 300° C. The oven temperature programming used was 60° C. isothermal for 5 min, increased to 165° C. at 15° C./min, isothermal for 1 min at this temperature, and then increased to 195° C. at 2° C./min and held isothermal for 14 min and then increased to 215° C. at 5° C./min and held isothermal for 8 min at 215° C. Hydrogen was used as carrier gas under constant flow mode at 1.5 mL/min.

Phospholipid Analysis: Phospholipid families were separated by normal-phase high-performance liquid chromatography using 2 Nucleosil 50-5, 250×3 mm, 5µ (Macherey-Nagel, Easton, USA) equipped with pre-column Nucleosil 50-5, 8×3 mm, 5µ (Macherey-Nagel, Easton, USA). The chromatography system consisted of an Agilent 1200 module (Agilent Technologies, Basel, Switzerland) and an in-line PL-ELS 1000 evaporative light scattering detector (Polymer Laboratories, Shropshire England). All chromatography was performed at 55° C. Solvent A was composed of ammonium formiate 3 g/L and solvent B of acetonitrile/methanol (100/3 v/v). Gradient conditions for phospholipid analysis were as follows: time=0 min 1% solvent A; time=19 min 30% solvent A; time=21 min 30% solvent A; time=24 min 1% solvent A; flow rate was 1 mL/min. Data were collected and processed using Agilent Chem. Station software.

Ganglioside Analysis: Gangliosides were separated by LC using an Aquity BEH C18 column (1.7 µm; 150×2.1 mm i.d.; Waters). The chromatography system consisted of Infinity1290 modules (Agilent Technologies, Basel, Switzerland) coupled to triple quadrupole mass spectrometer (Applied biosystems/MSD Sciex, 5500 Ontario, Canada). All chromatography was performed at 50° C. Solvent A composed of water/methanol/ammonium acetate (1 mM) (90/10/0.1 v/v/v) and solvent B of methanol/ammonium acetate (1 mM) (100/0.1 v/v). Gradient conditions were as follows: time=0 min 10% solvent A; time=0.2 min 10% solvent A; time=8.2 min 5% solvent A; time=12.2 min 5% solvent A; time=12.4 min 0% solvent A; time=18.4 min 0% solvent A; time=18.6 10% solvent A; time=21 10% solvent A. Flow rate was 0.2 mL/min. The mass spectrometer was equipped with electrospray ionization (ESI) ion source. The ESI mass spectra were recorded in the negative ion mode under the following conditions: ion spray voltage (IS) −4000 V, temperature of the source 250° C., declustering potential (DP) −40V. Disialogangliosides 3 (GD3) and monosialogangliosides 3 (GM3), were monitored by transitions of the precursor ions to the m/z 290 product ion listed in the Table 1. The ion m/z 290 corresponds to Neu5Ac fragments obtained from B type of cleavage according to (13). Data were collected and processed using Multiquant software 2.1 (Applied Biosystems, Sciex, Ontario, Canada). Quantification was performed by calibration curve. Stock solutions of GD3 and GM3 were prepared in methanol 70% (1 mg/mL) and further dilutions to volume with methanol 70% were performed to give 6 concentration levels covering a range from 7.5 to 22.5 µg/mL. Total area of GD3 and GM3 was calculated as the sums of peak areas of the transitions of the precursor ions to the m/z 290 product ion.

Statistical Analysis:

Data collection points are 1, 2 and 4 months after infants' birth. Table 2 shows the Min, Mean, SD and Max for each unit of measurement. Statistical models fitted to the raw data are shown in FIGS. 1-3. Longitudinal analysis was carried out using linear mixed models. The figures also show the sequential effect of each of the terms age, $age^2$, gender and age-gender interactions in this particular order in terms of the P-value for the corresponding F-test. Thus, the P[age] is a P value considering a linear model and P[$age^2$] corresponds to a quadratic one. The appropriate model is chosen according to whether the trajectory is linear (P[age]) or curved (P[$age^2$]).

Adjusted R-squares were computed to obtain the degree of variability that is explained by the statistical models used.

Analysis was carried out using the following mixed-effects linear model:

$$Conc:=Age+Age^2+Gender+Age\_Gender+(Age^2)\_Gender+Random\ Effects:$$

Random effects are subject specific terms to model the underlying correlation between repeat measures.

TABLE 1

Precursor ions for GD3 and GM3. The collision energy (CE) was set at −40 V.

| Type of molecular ion | Predicted m/z | Observed m/z | Mass Error (ppm) | Assigned structure |
|---|---|---|---|---|
| [M − H]⁻ | 1125.6897 | 1125.6902 | 8.7 | GM3d32:0 |
| [M − H]⁻ | 1151.7053 | 1151.7059 | −5.1 | GM3d34:1 |
| [M − H]⁻ | 1149.6897 | 1149.6002 | 8.5 | GM3d34:2 |
| [M − H]⁻ | 1175.7053 | 1175.7059 | 5.0 | GM3d36:3 |
| [M − H]⁻ | 1173.6869 | 1173.6902 | 8.3 | GM3d36:4 |
| [M − H]⁻ | 1207.7679 | 1207.7685 | 1.3 | GM3d38:1 |
| [M − H]⁻ | 1235.7992 | 1235.7998 | 0.2 | GM3d40:1 |
| [M − H]⁻ | 1223.7992 | 1223.7998 | 0.2 | GM3d40:7 |
| [M − H]⁻ | 1263.8305 | na | — | GM3d42:1 |
| [M − H]⁻ | 1261.8149 | na | — | GM3d42:2 |
| [M − 2H]²⁻ | 706.8808 | 706.8814 | −1.9 | GD3d32:1 |
| [M − 2H]²⁻ | 721.9043 | 721.9048 | −6.7 | GD3d34:0 |
| [M − 2H]²⁻ | 720.8965 | 720.8970 | 4.1 | GD3d34:1 |
| [M − 2H]²⁻ | 719.8887 | 719.8892 | 0.2 | GD3d34:2 |
| [M − 2H]²⁻ | 718.8808 | 718.8814 | −1.9 | GD3d34:3 |
| [M − 2H]²⁻ | 728.9121 | 728.9127 | −3.7 | GD3d35:0 |
| [M − 2H]²⁻ | 735.9195 | 735.9205 | 0.5 | GD3d36:0 |
| [M − 2H]²⁻ | 733.9043 | 733.9048 | −6.6 | GD3d36:2 |
| [M − 2H]²⁻ | 742.9278 | 742.9283 | 2.3 | GD3d37:0 |
| [M − 2H]²⁻ | 741.9200 | 741.9205 | −0.7 | GD3d37:1 |
| [M − 2H]²⁻ | 749.9356 | 749.8984 | 2.1 | GD3d38:0 |
| [M − 2H]²⁻ | 747.9200 | 747.9205 | 0.7 | GD3d38:2 |
| [M − 2H]²⁻ | 746.9121 | 746.9127 | −3.6 | GD3d38:3 |
| [M − 2H]²⁻ | 745.9043 | 745.9048 | 6.5 | GD3d38:4 |
| [M − 2H]²⁻ | 744.8965 | 744.8970 | −9.4 | GD3d38:5 |
| [M − 2H]²⁻ | 743.8887 | 743.8892 | 1.1 | GD3d38:6 |
| [M − 2H]²⁻ | 763.9513 | 763.9528 | −2.3 | GD3d40:0 |
| [M − 2H]²⁻ | 762.9434 | 762.9440 | −5.2 | GD3d40:1 |
| [M − 2H]²⁻ | 777.9669 | 777.9674 | 3.3 | GD3d42:0 |
| [M − 2H]²⁻ | 775.9513 | 775.9048 | −6.2 | GD3d42:2 | nd: not detected
na: identification by high mass resolution mass spectrometer was not possible because outside the capability m/z range of the instrument.

TABLE 2

Longitudinal evolution of the concentration of n-6 eicosatrienoic acid (DGLA) gangliosides and phospholipids in human milk (N = 50)

| Nutrient (mg per 100 mL) | Visit | Min | Mean | SD | max |
|---|---|---|---|---|---|
| n-6 eicosatrienoic acid | V1 | 2.04 | 15.38 | 6.43 | 31.92 |
| (DGLA) | V2 | 0.00 | 11.70 | 7.42 | 33.70 |
|  | V3 | 0.00 | 10.64 | 8.67 | 38.90 |
| GD3 | V1 | 0.08 | 0.23 | 0.12 | 0.69 |
|  | V2 | 0.02 | 0.19 | 0.20 | 1.06 |
|  | V3 | 0.00 | 0.17 | 0.19 | 0.89 |
| GM3 | V1 | 0.08 | 0.23 | 0.08 | 0.45 |
|  | V2 | 0.11 | 0.29 | 0.14 | 0.65 |
|  | V3 | 0.01 | 0.39 | 0.18 | 0.89 |
| GM3/GD3 | V1 | 0.13 | 1.29 | 0.77 | 3.60 |
|  | V2 | 0.16 | 3.28 | 2.96 | 13.44 |
|  | V3 | 0.11 | 5.97 | 7.12 | 37.11 |
| GM3 + GD3 | V1 | 0.21 | 0.46 | 0.15 | 1.07 |
|  | V2 | 0.17 | 0.47 | 0.23 | 1.37 |
|  | V3 | 0.06 | 0.55 | 0.27 | 1.49 |
| Sphingomyelin | V1 | 4.84 | 8.47 | 1.72 | 12.65 |
|  | V2 | 2.45 | 7.71 | 3.01 | 17.74 |
|  | V3 | 9.16 | 12.27 | 3.61 | 32.48 |
| Phosphatidylcholine | V1 | 3.29 | 5.97 | 1.34 | 9.23 |
|  | V2 | 1.62 | 4.84 | 2.06 | 11.92 |
|  | V3 | 1.97 | 4.94 | 1.88 | 10.16 |
| Phosphatidylethanolamine | V1 | 3.15 | 6.76 | 1.86 | 11.12 |
|  | V2 | 2.35 | 6.36 | 3.11 | 18.25 |
|  | V3 | 2.67 | 8.08 | 3.10 | 15.38 |
| Phosphatidylinositol | V1 | 0.54 | 1.07 | 0.35 | 2.25 |
|  | V2 | 0.41 | 1.13 | 0.55 | 2.70 |
|  | V3 | 0.64 | 1.67 | 0.66 | 3.88 |
| Phosphatidylserine | V1 | 0.27 | 0.75 | 0.31 | 1.93 |
|  | V2 | 0.35 | 0.75 | 0.33 | 1.71 |
|  | V3 | 0.39 | 0.91 | 0.33 | 1.93 |

Example 2

An example of a starter infant formula for infants up to the age of three months is given below. The protein source is a conventional mix of whey protein and casein.

| Nutrient | per 100 kcal | per litre |
|---|---|---|
| Energy (kcal) | 100 | 659.2 |
| Protein (g) | 1.67 | 11.02 |
| Fat (g) | 6.28 | 41.72 |
| Linoleic acid (g) | 0.85 | 5.66 |
| α-Linolenic acid (mg) | 60 | 400.4 |
| n-6 eicosatrienoic acid (mg) | 20 | 153.8 |
| Lactose (g) | 9.7 | 62.76 |
| Minerals (g) | 0.37 | 2.5 |
| Na (mg) | 23 | 150 |
| K (mg) | 89 | 590 |
| Cl (mg) | 64 | 430 |
| Ca (mg) | 62 | 410 |
| P (mg) | 31 | 210 |
| Mg (mg) | 7 | 50 |
| Mn (µg) | 8 | 50 |
| Se (µg) | 2 | 13 |
| Vitamin A (µg RE) | 105 | 700 |
| Vitamin D (µg) | 1.5 | 10 |
| Vitamin E (mg TE) | 0.8 | 5.4 |
| Vitamin K1 (µg) | 8 | 54 |
| Vitamin C (mg) | 10 | 67 |
| Vitamin B1 (mg) | 0.07 | 0.47 |
| Vitamin B2 (mg) | 0.15 | 1 |
| Niacin (mg) | 1 | 6.7 |
| Vitamin B6 (mg) | 0.075 | 0.5 |
| Folic acid (µg) | 9 | 60 |
| Pantothenic acid (mg) | 0.45 | 3 |
| Vitamin B12 (µg) | 0.3 | 2 |
| Biotin (µg) | 2.2 | 15 |
| Choline (mg) | 10 | 67 |
| Fe (mg) | 1.2 | 8 |

-continued

| Nutrient | per 100 kcal | per litre |
|---|---|---|
| I (µg) | 15 | 100 |
| Cu (mg) | 0.06 | 0.4 |
| Zn (mg) | 0.75 | 5 |
| GM3 (mg) | 0.35 | 2.3 |
| GD3 (mg) | 0.33 | 2.3 |
| Phosphatidylcholine (mg) | 9.14 | 59.7 |
| Phosphatidylethanolamine (mg) | 10.33 | 67.6 |
| Phosphatidylinositol (mg) | 1.66 | 10.7 |
| Phosphatidylserine (mg) | 1.17 | 7.5 |

Example 3

An example of the composition of a hypoallergenic (HA) infant formula for infants older than three months according to the present invention is given below. This composition is given by way of illustration only. The protein source is a conventional mix of whey protein and casein.

| Nutrient | per 100 kcal | per litre |
|---|---|---|
| Energy (kcal) | 100 | 702.43 |
| Protein (g) | 1.29 | 8.31 |
| Fat (g) | 6.31 | 46.47 |
| Linoleic acid (g) | 0.87 | 6.28 |
| α-Linolenic acid (mg) | 50 | 380.5 |
| n-6 eicosatrienoic acid (mg) | 10 | 106.4 |
| Lactose (g) | 9.48 | 64.45 |
| Minerals (g) | 0.37 | 2.5 |
| Na (mg) | 23 | 150 |
| K (mg) | 89 | 590 |
| Cl (mg) | 64 | 430 |
| Ca (mg) | 62 | 410 |
| P (mg) | 31 | 210 |
| Mg (mg) | 7 | 50 |
| Mn (µg) | 8 | 50 |
| Se (µg) | 2 | 13 |
| Vitamin A (µg RE) | 105 | 700 |
| Vitamin D (µg) | 1.5 | 10 |
| Vitamin E (mg TE) | 0.8 | 5.4 |
| Vitamin K1 (µg) | 8 | 54 |
| Vitamin C (mg) | 10 | 67 |
| Vitamin B1 (mg) | 0.07 | 0.47 |
| Vitamin B2 (mg) | 0.15 | 1 |
| Niacin (mg) | 1 | 6.7 |
| Vitamin B6 (mg) | 0.075 | 0.5 |
| Folic acid (µg) | 9 | 60 |
| Pantothenic acid (mg) | 0.45 | 3 |
| Vitamin B12 (µg) | 0.3 | 2 |
| Biotin (µg) | 2.2 | 15 |
| Choline (mg) | 10 | 67 |
| Fe (mg) | 1.2 | 8 |
| I (µg) | 15 | 100 |
| Cu (mg) | 0.06 | 0.4 |
| Zn (mg) | 0.75 | 5 |
| GM3 (mg) | 0.56 | 3.9 |
| GD3 (mg) | 0.27 | 1.7 |
| Phosphatidylcholine (mg) | 6.89 | 49.4 |
| Phosphatidylethanolamine (mg) | 11.28 | 80.8 |
| Phosphatidylinositol (mg) | 2.34 | 16.7 |
| Phosphatidylserine (mg) | 1.3 | 9.1 |

The invention claimed is:

1. A method for promoting a healthy establishment of cognitive function in an infant younger than three months old, the method comprising administering to the infant younger than three months old a synthetic nutritional composition comprising:
   13.8-17 mg/100 ml of n-6 eicosatrienoic acid;
   0.2-0.25 mg/100 ml of disialoganglioside-3 (GD-3); and
   0.2-0.25 mg/100 ml of monosialoganglioside-3 (GM-3);
   the GM-3 and the GD-3 in a GM-3:GD-3 ratio of 1.2 to 1.35.

2. The method of claim 1, wherein the healthy establishment of cognitive function is measured according to at least one of Griffiths Scales or Bayley Scales.

3. The method of claim 1, wherein:
   the n-6 eicosatrienoic acid is 15.0-16.0 mg/100 ml of the synthetic nutritional composition;
   the disialoganglioside-3 (GD-3) is 0.21-0.24 mg/100 ml of the synthetic nutritional composition;
   the monosialoganglioside-3 (GM-3) is 0.21-0.23 mg/100 ml of the synthetic nutritional composition; and
   the synthetic nutritional composition further comprises 8.2-8.7 mg/100 ml of sphingomyelin.

4. The method of claim 1, wherein the infant had a birth weight less than 2500 g.

5. The method of claim 1, wherein the synthetic nutritional composition further comprises 7.6-9.3 mg/100 ml of sphingomyelin.

6. The method of claim 1, wherein the synthetic nutritional composition further comprises a phospholipid selected from the group consisting of:
   5.4-6.6 mg/100 ml of phosphotitdylcholine;
   6.0-7.5 mg/100 ml of phosphotitdylethanolamine;
   1-1.2 mg/100 ml of phosphotitdylinositol; and
   0.7-0.8 mg/100 ml of phosphotitdylserine.

7. The method of claim 1, wherein the infant was small for gestational age.

8. The method of claim 1, wherein the infant experienced intrauterine growth retardation.

9. The method of claim 1, wherein the infant is suffering or suffered from cognitive function impairment during at least one of in utero, during birth, or after birth.

* * * * *